Sept. 18, 1962   F. W. RECKNAGEL   3,054,164
METHOD OF PRODUCING AND ASSEMBLING ANTIFRICTION BEARINGS
Filed April 6, 1960   2 Sheets-Sheet 1

INVENTOR.
FREDERICK W. RECKNAGEL
BY
E. J. Kalil
AGENT

Sept. 18, 1962   F. W. RECKNAGEL   3,054,164
METHOD OF PRODUCING AND ASSEMBLING ANTIFRICTION BEARINGS
Filed April 6, 1960   2 Sheets-Sheet 2
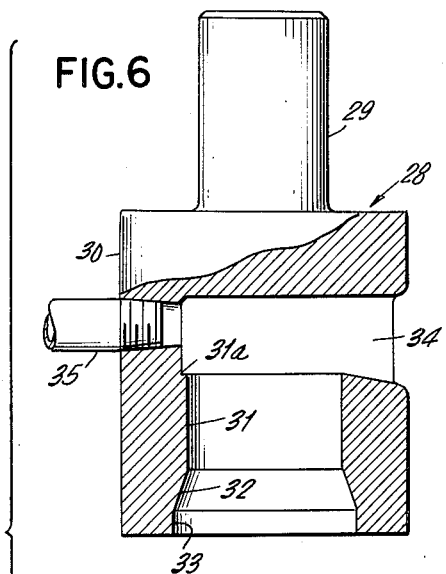
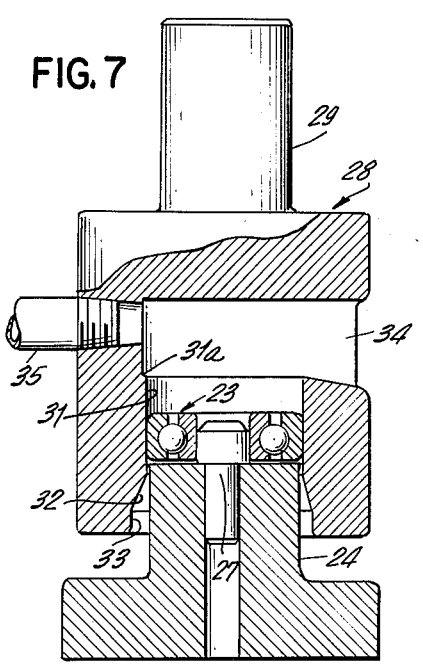
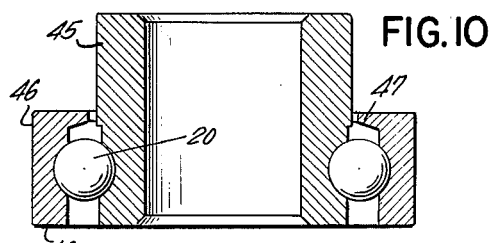
INVENTOR.
FREDERICK W. RECKNAGEL
BY
E. J. Kalil
AGENT

United States Patent Office 3,054,164
Patented Sept. 18, 1962

3,054,164
METHOD OF PRODUCING AND ASSEMBLING ANTIFRICTION BEARINGS
Frederick W. Recknagel, Verbank, N.Y., assignor to The Schatz Manufacturing Company, Poughkeepsie, N.Y., a corporation of New York
Filed Apr. 6, 1960, Ser. No. 20,451
2 Claims. (Cl. 29—148.4)

This invention relates to a method of providing antifriction bearings formed of inner and outer annular bearing members and in particular to a method of making and assembling antifriction bearings having uninterrupted raceways.

It has long been recognized that it would be desirable to provide ball or roller bearings having uninterrupted raceways which have no break in their continuity, that is raceways which have no notch or slot or any line of separation or demarcation resulting from the use of a plurality of raceways sections for effecting the assembly of a full complement of antifriction elements, e.g. ball or roller elements, within the bearing.

Various methods have been proposed for providing uninterrupted and integral grooved raceways. One method proposed comprised telescoping a solid inner annular member of finished size within a solid outer annular member also of finished size with the raceway of one oppositely disposed to the raceway of the other. One of the members would then be displaced eccentrically in the same plane relative to the other to form a crescent shaped spacing between them into which a limited number of antifriction elements could be introduced and subsequently distributed by thereafter concentrically spacing the inner and outer members, with the antifriction elements held apart by separator or spacing devices. While this method resulted in solid or continuous raceways, it had its disadvantages in that a full complement of bearing balls could not be inserted and the bearings produced fell short of the ideal bearing.

Another method proposed was to nest the inner bearing member within the outer bearing member with their axes slightly oblique, providing a plurality of balls at the annular opening therebetween, and then force the raceways and the balls into the same plane in a suitable press. This method likewise had its limitations in that the raceways and balls were subject to mutilation, giving rise to imperfections in the final assembled bearing.

Still another method comprised producing the inner annular member sufficiently undersize in diameter or the outer annular member sufficiently oversize in diameter to enable assembly of the balls, placing the balls in the raceway of one member and holding them in position by a cage or other means, telescoping the two elements concentrically with the caged balls in place and radially deforming the offsized bearing member either by expanding the inner member or compressing the outer member, whichever member is offsize, whereby the members are interlocked in cooperative relation with each other through the antifriction elements. The disadvantage here was that in order to carry out the step of assembling the antifriction elements, the elements had to be held in one of the raceways by a cage or other device in order to clear the annular opening between the two members and to insure precise positioning of the elements during, for example, the radial expansion of the undersize inner bearing member to avoid mutilation of the raceways or brinelling of the surface adjacent the raceways.

I have now discovered a method for producing an antifriction bearing with continuous solid raceways containing a complement of antifriction elements by starting with inner and outer annular bearing members of substantially finished size.

It is the object of this invention to provide an antifriction bearing comprising inner and outer annular members having continuous raceways containing a complement of antifriction elements.

Another object is to provide an improved method for assembling an antifriction bearing having continuous raceways by starting with inner and outer annular bearing members of finished size and inserting within the raceways defined by the bearing elements a complement of antifriction rolling elements.

These and other objects will more clearly appear from the disclosure and the appended drawings in which:

FIGS. 6 and 7 show in partial vertical section the dies employed for effecting interlocking by means of the antifriction elements between inner and outer bearing members; and FIGS. 8 to 11 are illustrative of the various types of antifriction bearings which may be produced with continuous solid raceways in accordance with the invention.

Figure 1:
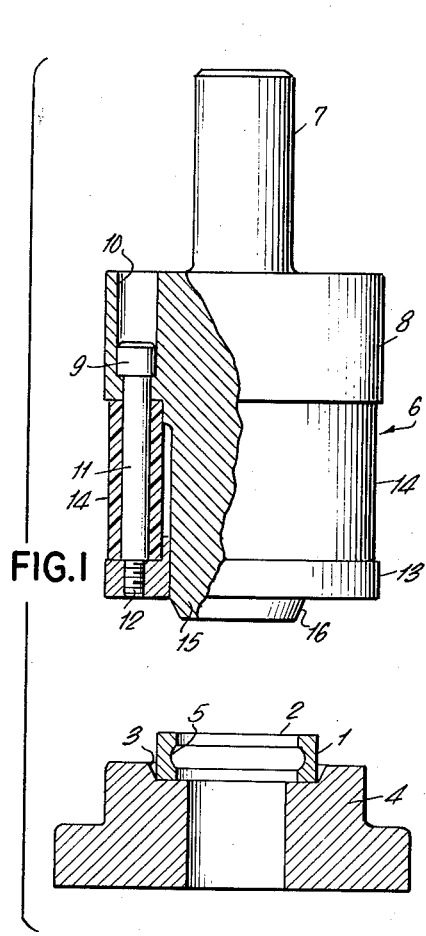
FIGS. 1 and 2 illustrate one part of a die set up employed in carrying out one step of the process.

In carrying out my invention, I employ a unique method of assembly by starting with a machined deformable ductile annular outer bearing member of substantially finished size having a race on its inner wall and a machined annular inner bearing member also of substantially finished size with a race on its outer wall. I then deform a peripheral edge portion of the outer ductile member by flaring it outward without substantially affecting the dimensions of the peripheral edge portion on the other side of the bearing member. I control the amount of peripheral deformation via a tapered or other type of flaring tool, the amount of deformation being such that when the inner bearing member is telescoped substantially concentrically within the deformed outer member in substantially what would be the final bearing relationship, a tapered annular mouth is defined whose width in the neighborhood of the entrance portion of the mouth relative to the diameter of the antifriction elements is such that when a plurality of antifriction elements are provided at the flared mouth portion, they may be caused to enter the confining space defined by the two raceways. In most instances, this would be achieved by manipulating one of the bearing members with respect to the other. Such manipulation may comprise a vertical displacement of the inner member along its axis or a slight tilting or rocking of the same to expose a sufficient amount of the undercut portion of the raceway of the inner member so that a complement of antifriction elements will fall into the confining space defined by the raceways.

In carrying out my invention, I prefer that the width in the neighborhood of the entrance portion of the tapered mouth be a value corresponding at least approximately to the diameter of the antifriction element less the depth of the raceway on the inner annular member and range up to a value corresponding approximately to the diameter of the antifriction element. In so far as the invention is concerned, the lower and upper limit of the aforementioned range may vary a few thousandths one way or the other as will be understood from the description.

As stated above, one method of effecting the assembly is to elevate the inner annular member sufficiently, while maintaining it substantially concentrically positioned, so that its raceway is brought substantially opposite the peripherally flared portion of the outer member near the entrance portion of the annular mouth, whereby the antifriction elements are caused to drop by gravity into the raceway portion of the inner member. By lowering the inner member telescopically to its former position, the antifriction elements held in said raceway follow downward unhampered between the annular space of the bearing members until the elements reach the position of the other raceway and are held cooperatively thereby since the bottom of the outer bearing member is substantially the finished size, the annular space there being too small for the antifriction elements to pass therethrough.

The method of tilting or rocking the inner bearing member from its substantially concentric position relative to the axis of the outer bearing member, as stated above, causes the antifriction elements to slip by the flared annular mouth and drop into the confining space defined by the two raceways. Any method which will effect a small relative displacement between the inner and outer bearing members may be employed to cause the antifriction elements to enter the raceway space, provided the width of the annular mouth, with the inner and outer bearing members referred to their concentric positions, preferably corresponds at least substantially to that of the diameter of the antifriction elements less substantially the depth of the inner raceway and ranges up to substantially the diameter of the antifriction elements.

After the foregoing assembly has been effected, the flared portion is reformed back to its original position by means of the hollow tapered forming tool or other suitable reforming means.

Figure 2:
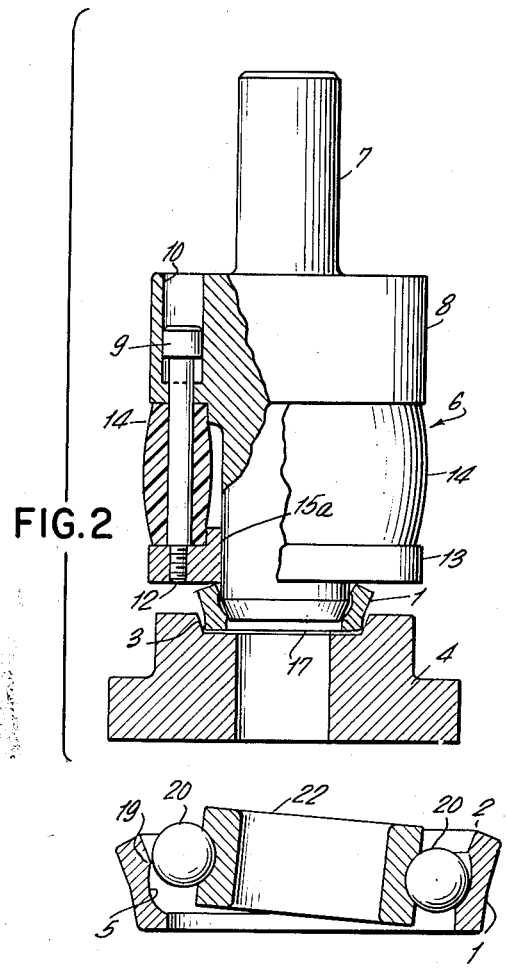

The invention will be better appreciated by referring to FIGS. 1 and 2 which show one embodiment of dies which may be employed in flaring the peripheral edge portion 2 of outer bearing member 1 shown in vertical cross section seated in recess 3 of a lower die 4 supported by a press platen not shown. The outer member has a raceway or groove 5 on its inner wall.

Above die 4 is a punch assembly indicated generally by the numeral 6 comprising a shank 7 which is held within the opening of a ram of the upper portion of the press (not shown), the punch assembly 6 having a body portion 8 with peripherally arranged guide pins 11 slidably mounted in openings 10 via pin heads 9, one end of the pins being screwed at 12 to stripper plate 13. The pins are surrounded by a resilient member 14 of thick rubber, e.g. oil resistant synthetic rubber such as neoprene or like material, the pins passing through the annulus of resilient member 14 as shown in FIG. 1. Extending downwardly from body portion 8 is flaring tool 15 having tapered end portion 16 which is designed to flare outwardly the peripheral edge 2 of outer bearing member 1. As punch assembly 6 is brought downward by conventional press mechanism (not shown), the outer bearing member is flared outwardly as shown in FIG. 2 until stripper plate 13 contacts the top edge of member 1. Because plate 13 is connected to slidably mounted pins 11, it slides upwardly along surface 15a of flaring tool 15 as shown in FIG. 2, whereby resilient member 14 is caused to bulge slightly. When the punch is raised, resilient member resumes its original shape and pushes stripper plate downward to remove or strip deformed member 1 from the punch.

The diameter of the flaring tool at its bottom end 17 may correspond substantially to or may be smaller than the inner diameter of the outer bearing member so that this portion of the outer bearing member will not be subject to any measurable amount of deformation from the tool, the major amount of deforming being concentrated at the peripheral edge portion 2 of outer member 1.

As stated hereinbefore, it is preferred that the amount of peripheral flaring be such that the width "W" of the annular mouth 18 near the region of raceway shoulder 19 (note FIG. 3) corresponds at least substantially to the diameter of antifriction element 20 less the depth of raceway 21 of inner bearing member 22 and ranges up to substantially the diameter "D" of the antifriction element, it being understood that the upper and lower limits of the range may vary a few thousandths one way or the other, e.g. vary to ±0.005 inch. The flaring should preferably be sufficient to move back shoulder 19 and open up the raceway so that ball 20 is enabled to pass by it easily when the aforementioned conditions are met. It will be noted from FIG. 3 that while the upper peripheral portion 2 of outer member 1 has been appreciably flared outward to enable assembly of the bearing, the bottom peripheral portion 2a maintains its original machined dimension so that in conjunction with inner bearing member 22, the annular space "A" is maintained substantially in accordance with the final dimension. This embodiment is important as it enables the assembly of the bearing with a substantially full complement of ball elements without the balls dropping through as might occur if the outer bearing member were completely oversized throughout its cross section.

Figure 5:
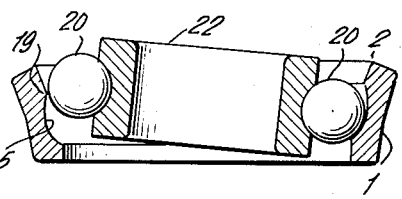
FIGS. 3 to 5 depict several methods for assembling antifriction elements within the raceway space between inner and outer bearing members.
Figure 4:
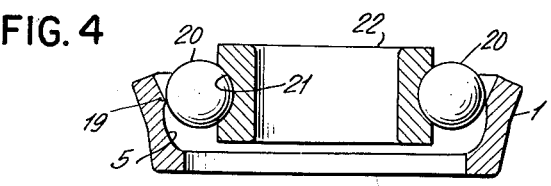

Referring now to FIG. 4, one method of assembly is shown wherein inner bearing member 22 is displaced vertically with respect to outer member 1 sufficiently to enable a full complement of balls 20 to cradle within raceway 21 so that as the inner member is lowered to its final position, the cradled balls will be enabled to pass shoulder 19 into the confining space defined by raceways 5 and 21. In FIG. 5, the assembling of the bearing is shown being achieved by tilting or rocking inner member 22 about its vertical axis until all the balls are in place. Somewhat the same effect may be achieved by slight sidewise displacement of the inner annular member or, if desired, all three types of manipulations may be combined, that is a slight movement upward coupled with a slight tilting or rocking and intermittent sidewise motion.

The foregoing types of assembly are made possible without the balls dropping through the annular space between the inner and outer members because only a limited portion of the outer member is deformed while the rest is close to finish size.

After completion of assembly, the assembled bearing referred to generally as 23 (note FIGS. 6 and 7) is placed on a die block 24 suitably mounted on a press platen (not shown), said block having an opening 25 therethrough in which is mounted a pilot 26 via its reduced section 27. The pilot 26 has a diameter sufficient to enable it to pass through the opening of the inner bearing member and hold the bearing assembly in position for the closing operation via closing punch designated generally by the number 28.

The closing punch which is mounted in the press above die block 24 by suitable mechanism (not shown) for lowering and raising it comprises a shank 29 integral with enlarged portion 30 of the punch. The punch has a cylindrical cavity 31 corresponding to the outside diameter of the finished bearing assembly, the cavity opening into a tapered section 32 corresponding to a portion of a cone which in turn is coextensive with hollow cylindrical surface 33, the diameter of the latter being slightly larger than the maximum outside diameter of the flared portion of the outer bearing member 1. Cylindrical cavity 31 extends into chamber 34 of closing punch 28, said opening having in communication therewith threaded pipe or tube 35 for delivering compressed air into the die to eject a completed bearing assembly.

In closing up the flared portion of the outer bearing member, closing punch 28 is lowered as shown in FIG. 7 and the flared portion gradually closed via taper 32 of the hollow closing punch until the right cylindrical surface 31 of the punch is reached. The downward travel of the closing punch is continued until the assembled bearing has been deposited in chamber 34 on ledge 31a, the punch and die thereafter separated, and the assembled bearing in chamber 34 ejected by compressed air from pipe 35.

As there might be a slight spring back of the outer bearing member after the closing operation, this can be taken into account in designing the bearing as is well known by those skilled in the art.

After the bearing has been assembled, if it has been made from heat treatable steel, it may be subjected to heat treatment and hardened followed by accurate grinding of the outer and inner surfaces of the outer and inner bearing members, respectively.

In producing the bearing from a heat treatable steel, I prefer starting with the steel in the fully annealed state.

As examples of bearings which may be produced in accordance with my invention, reference is made to FIGS. 8 to 11. In FIG. 8, inner member 36, interlocked with outer member 37 via balls 20, extends beyond both sides of the outer member. In assembling this bearing, a jig would be used to hold the members in alignment during the closing operation. Annular flexible seals 38 are provided held in place by snap rings 39, the seals being applied after the bearing has been completely finished.

In FIG. 9, another bearing is illustrated comprising inner bearing member 40 and outer member 41 of still other configurations with balls 20 therebetween sealed off by shields 42. It will be noted that outer member 41 has an outwardly extending flange 43 protruding therefrom. In assembling this bearing, peripheral edge portion 44 would be flared outwardly as disclosed herein to aid in assembly and thereafter closed, using appropriate jigs and dies for supporting the members relative to one another during the closing operation.

FIG. 10 illustrates a bearing having a somewhat long inner bearing member 45 in the axial direction surrounded by an outer member 46 having a closed end defined by inwardly projecting flange 47, the peripheral edge portion 48 at the open end being the portion that is flared outward in order to effect assembly of the bearing. The closing operation would be effected by using suitable jigs and dies for centering the inner member relative to the flared outer member.

Figure 3:
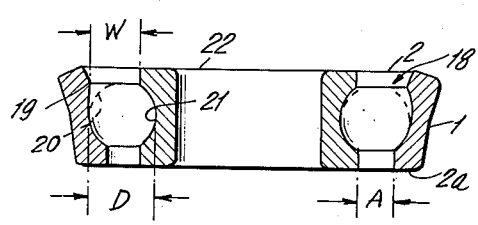

The bearing of FIG. 11 is similar in some respects to that being assembled in FIGS. 3 to 5 except that outer member 49 surrounding inner member 50 has a closed end defined by inwardly projecting flange 51, the peripheral edge portion 52 at the open end being the portion that is flared outward and thereafter closed after assembly of the ball elements.

As stated hereinbefore, if the bearing is produced from hardenable steel, the assembled bearing may thereafter be hardened by known heat treating means. The outer member should be ductile; where the outer member might be subjected to more than the usual amount of work hardening during flaring, then the flared member may be softened by annealing before being subjected to the closing operation.

While I have shown a tapered tool for flaring the outer member, it will be appreciated that other tools might be employed, such as a hardened spherical ball whose diameter is larger than the inner diameter of the outer member. The flaring could also be achieved by a type of spinning tool by rotating said outer member in a chuck while bearing angularly against the peripheral edge of the outer member with the tool.

Although the invention is particularly applicable to the production of bearings with a full complement of antifriction elements, it will be appreciated that the invention may also be applied to the production of bearings in which a full complement of elements is not required. Thus, where less than a full complement is employed, mechanical means, such as a cage may be used to evenly space the antifriction elements. As will be obvious to those skilled in the art, after the bearing has been assembled, cage components may be inserted into the annular space between the inner and outer bearing members to keep the antifriction elements evenly spaced.

While the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. A method of making antifriction bearings which comprises providing a machined deformable annular outer bearing member of substantially finished size having a raceway on its inner wall; providing a machined annular inner bearing member also of substantially finished size with a raceway on its outer wall for cooperating with the raceway of the outer member for holding ball elements therebetween in interlocking relationship; deforming by flaring outwardly a peripheral edge portion of said outer member while leaving the opposite peripheral edge at substantially the finished size, the amount of deformation at the peripheral edge being sufficient to open up a portion of the raceway near said peripheral edge portion of the outer member so that when the inner member is telescoped within the outer member in substantially concentric relation for bearing assembly, a tapered annular mouth is defined whose width in the neighborhood of its entrance portion near the open raceway portion corresponds substantially at least to the diameter of the ball elements less substantially the depth of the inner raceway and ranges up to substantially the diameter of the ball elements; telescoping said inner bearing member within said flared outer bearing member; providing a complement of ball elements at the flared mouth portion of said annular bearing; causing said ball elements to pass by gravity said flared mouth portion into the region of said raceways via the open raceway portion by manipulation of one of the bearing members; and reforming said flared portion of the outer bearing back to its substantially original dimension.

2. A method of making antifriction bearings which comprises providing a machined deformable annular outer bearing member of substantially finished size having a raceway on its inner wall; providing a machined annular inner bearing member also of substantially finished size with a raceway on its outer wall for cooperating with the raceway of the outer member for holding ball elements therebetween in interlocking relationship; deforming by flaring outwardly a peripheral edge portion of said outer member while leaving the opposite peripheral edge at substantially the finished size, the amount of deformation at the peripheral edge being sufficient to open up a portion of the raceway near said peripheral edge portion of the other member so that when the inner member is telescoped within the outer member in substantially concentric relation for bearing assembly, a tapered annular mouth is defined whose width in the neighborhood of its entrance portion near the open raceway portion corresponds substantially at least to the diameter of the ball elements less substantially the depth of the inner raceway and ranges up to substantially the diameter of the ball elements; telescoping said inner bearing member within said flared outer bearing member; providing a complement of ball elements at the flared mouth portion of said annular bearing; causing said ball elements to pass by gravity said flared mouth portion into the region of said races via the open raceway portion by manipulation of one of the bearing members; deforming said flared portion of the outer bearing back to its substantially original dimension; and subjecting said bearing to a hardening heat treatment.

References Cited in the file of this patent

UNITED STATES PATENTS

| | | |
|---|---|---|
| 941,632 | Geschke | Nov. 30, 1909 |
| 1,080,169 | Reed | Dec. 2, 1913 |
| 1,153,066 | Gurneg | Sept. 7, 1915 |
| 2,913,810 | Heim | Nov. 24, 1959 |